United States Patent [19]

Izumo et al.

[11] 4,046,530

[45] Sept. 6, 1977

[54] MULTI-STAGE FLUIDIZED-BED ACTIVATED CARBON REGENERATION APPARATUS

[75] Inventors: Masanori Izumo, Neyagawa; Sigeru Nakakita, Takatsuki, both of Japan

[73] Assignee: Daikin Kogyo Co. Ltd., Osaka, Japan

[21] Appl. No.: 672,482

[22] Filed: Mar. 31, 1976

[30] Foreign Application Priority Data

Apr. 4, 1975 Japan .................. 50-41503
Apr. 18, 1975 Japan .................. 50-47852

[51] Int. Cl.$^2$ .................. B01J 9/18; B01D 53/08
[52] U.S. Cl. .................. 55/181; 23/277 C; 55/208; 55/390
[58] Field of Search .................. 23/277 C; 55/34, 60, 55/61, 62, 77, 79, 99, 181, 208, 390; 201/31; 210/33, 80, 189, 269, 270; 252/416, 417, 418, 420, 445

[56] References Cited

U.S. PATENT DOCUMENTS

| | | | |
|---|---|---|---|
| 2,419,245 | 4/1947 | Arveson | 252/417 |
| 2,766,185 | 10/1956 | Pansing | 252/417 X |
| 2,851,428 | 9/1958 | Wayne et al. | 252/417 |

Primary Examiner—Wilbur L. Bascomb, Jr.
Assistant Examiner—Robert H. Spitzer

[57] ABSTRACT

An apparatus for fluidizing regeneration of activated carbon which has adsorbed therein organic contaminants such as organic amines, organic sulfur compounds and organic solvents. The apparatus comprises; a horizontal grid disposed within the housing thereof; a port for supplying activated carbon as well as a regenerating gas discharge port, both of which are provided in one end wall of the housing; and a regenerating gas supply port and a regenerated activated carbon discharge port, both of which are provided in the other end wall thereof. The interior of the housing is divided by one or more vertical walls into a plurality of chambers, each wall has an opening above the grid through which activated carbon flows, each chamber has a top outlet opening and bottom inlet opening, which are connected to each other by means of a regenerating gas circulating path to form a circulating system for the chamber, each circulating system has a blower and heat exchanger, and the neighboring circulating systems are connected to each other by a gas passage.

10 Claims, 2 Drawing Figures

MULTI-STAGE FLUIDIZED-BED ACTIVATED CARBON REGENERATION APPARATUS

BACKGROUND OF THE INVENTION

This invention relates to an apparatus for regenerating activated carbon having organic contaminants adsorbed therein, such as organic solvents, organic amines and organic sulfur compounds.

A system which is used for removing contaminants from gases containing organic contaminants is shown in U.S. Pat. No. 3,455,089, and which is used for regenerating activated carbon by heating activated carbon having contaminants adsorbed, for removal of the contaminants therefrom. As an apparatus for regenerating activated carbon, a packed column type device and a moving layer type device have hitherto been in general use, but a fluidic layer type apparatus does not find a practical use. The reason is that while the fluidic layer type apparatus is superior in regeneration efficiency, it requires an extremely large amount of regenerating gas for forming a fluidic layer and, therefore, is extremely inferior in thermal efficiency.

SUMMARY OF THE INVENTION

The apparatus according to the present invention comprises; a horizontal grid disposed within the housing of the apparatus; a port for supplying activated carbon being treated as well as a regenerating gas discharge port, both of which are provided in the upper portions of one end wall of the housing; a regenerating gas supply port provided in the lower portion of the other end wall thereof; a regenerated activated carbon discharge port provided in the other end wall of the body proper at a level higher than said grid; and a plurality of chambers defined by one or more partitioning walls within the body proper. Each partitioning wall has an opening, through which activated carbon flows, in a portion adjacent to and above the horizontal grid, so that activated carbon being treated may be allowed to flow through respective openings sequentially into respective chambers. Each chamber has a top outlet opening and a bottom inlet opening, which are connected to each other by a circulating path, whereby a circulating system for each chamber is constituted. Each circulating system has a blower and a heat exchanger, and regenerating gas is circulated within each circulating system. The neighboring circulating systems are communicated with each other, so that a part of the regenerating gas circulating within one circulating system may be streamed into the other circulating system in the neighborhood thereof.

Advantages accruing from the present invention may be summarized as follows:

1. According to the apparatus of the present invention, activated carbon is brought into contact with a regenerating gas in a counter current flow as a whole in the apparatus, such that activated carbon containing the maximum of adsorbed materials is first fluidified by a regenerating gas containing the maximum of adsorbed materials, and with progress of decontamination of activated carbon, activated carbon will come in to contact with a regenerating gas fresher than before, whereby regeneration of activated carbon is effected at high efficiency with the use of only a small amount of fluidifying gas.

2. In the apparatus for fluidizing regeneration of activated carbon according to the present invention, regenerating gas essentially has the functions of (1) removing adsorbed organic compounds from activated carbon; (2) making a fluidized bed of activated carbon; and (3) heating activated carbon. To accomplish these functions, a minimum flow rate of gas is required. A flow rate of gas necessary for forming a fluidic layer of activated carbon is extremely high, as compared with the cases (1) and (3), and in order to remove adsorbed organic compounds, an extra consumption of gas is incurred. For these reasons, a flow rate of regenerating gas in the circulating systems, according to the present invention, is set to a value sufficient to form a fluidized bed of activated carbon, and a flow rate of regenerating gas which is fed through the supply port is set to a value sufficient to remove the adsorbed organic compounds. Thus, a quantity of regenerating gas discharged through discharge port may be minimized, thereby reducing heat discarded from the apparatus while increasing concentration of organic compounds contained in the exhaust gas. In the apparatus of the present invention, regenerating gas accomplishes the function of heating activated carbon at the same time.

3. The apparatus of the present invention is constructed as a horizontal, multi-stage type, fluidized bed forming apparatus, so as to lengthen a fluidizing period or residence time, so that extremely high regenerating capacity is obtained for a quantity of regenerating gas supplied, and heat necessary for regeneration of activated carbon is greatly saved. In addition, adsorbed matters are discharged in the concentrated state through the regenerating gas discharge port provided in one terminal chamber, as compared with the case in a single stage fluidizing regeneration device. This contributes to not only reducing the size of a condensation and recovery device for adsorbed matters, which is to be attached to the regenerating apparatus, if such adsorbed matters are of a useful material but also produces an improved condensation and recovery efficiency thereof.

It is accordingly an object of the present invention to provide an apparatus for the fluidizing regeneration of activated carbon, wherein thermal efficiency is greatly improved.

It is another object of the present invention to provide an apparatus for the fluidizing regeneration of activated carbon, wherein the quantity of regenerating gas being supplied is minimized.

The above and other objects, features and advantages of the present invention will become more apparent from the following description, when considered along with the accompanying drawing which shows, for purpose of illustration, preferred embodiments of the present invention.

DESCRIPTION OF THE PREFERRED EMBODIMENTS

Figure 1:
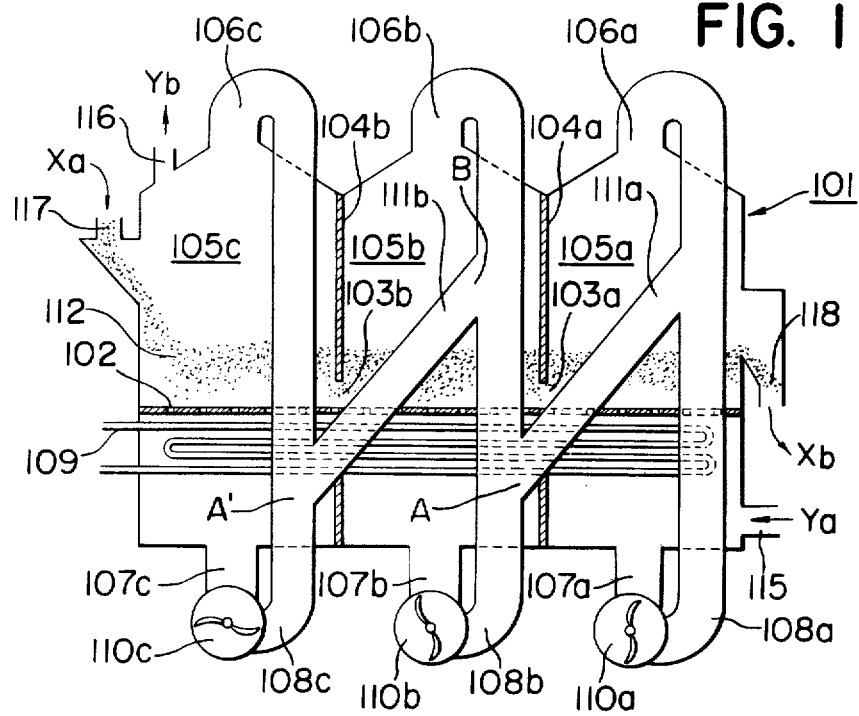
FIG. 1 is a vertical longitudinal view, partially in cross-section, diagramatically showing an apparatus of the present invention.

Referring first to FIG. 1, shown at 101 is a housing of the apparatus of the present invention, and at 102 a grid on which a fluidic layer of activated carbon is to be formed. Activated carbon Xa to be regenerated is supplied through a supply port 117 into the interior of the apparatus, then a fluidized bed of activated carbon is formed on the grid by means of regenerating gas (fluidifying gas), whereby adsorbed organic compounds is removed from activated carbon, i.e. activated carbon is regenerated or decontaminated, and activated carbon thus regenerated Xb will be discharged through a discharge port 118. Activated carbon is granular in the order of 0.1 to 3.0 mm in mean grain diameter.

The interior of the housing 101 is partitioned by a plurality of vertical partitioning walls 104 into a plurality of chambers 105. The plurality of vertical partitioning walls respectively has an opening 103, through which activated carbon flows, in a portion above the grid. Respective chamber has a top outlet opening 106 and bottom inlet opening 107, both of which are joined to each other by a circulating path 108 provided outside of the housing 101. Thus, one regenerating gas circulating system for every chamber is constituted by the combination of one circulating path 108 and one chamber. The circulating systems in the neighborhood are communicated with each other through the intermediary of a gas passage 111. Each circulating system is equipped with a blower 110 and a heat exchanger 109. Air, steam, an inactive gas or a mixture thereof, Ya, which is regenerating gas, is supplied through a supply port 115 provided in the body proper into the first chamber 105a, and the regenerating gas thus supplied is caused to circulate through a first circulating system for fluidizing regeneration of activated carbon. A part of the circulating gas is transferred through the gas passage 111a branched off from the first circulating path 108a into a second circulating system in the neighborhood of the first circulating system, and circulates within the second circulating system as fluidizing gas for the chamber 105b. In like manner, regenerating gas is moved from a preceding chamber to a succeeding chamber, as viewed in the direction of stream of gas, and eventually discharged through a discharge port 116 provided in one terminal chamber (a chamber 105c in FIG. 1). On the other hand, activated carbon, Xa, being treated, forms a fluidized bed 112 in each respective chamber and passes by means of the regenerating gas through the opening 103 provided in the respective partitioning wall. With the movement of activated carbon from a succeeding chamber to a preceding chamber which adjoin each other, the extent of regeneration of activated carbon increases, and activated carbon is eventually discharged as regenerated activated carbon through the discharge port 116 to the outside of the housing.

Movement of regenerating gas from a preceding chamber to a succeeding chamber is effected through respective gas passages 111. Junctions at which the gas passages, respectively extending between two adjacent chambers, join one circulating path are such that, as viewed in the second circulating path 108b, a junction A at which the first gas passage 111a leading from the preceding or first circulating path 108a for the first chamber 105a joins the second circulating path 108b is more distant from the surface of fluidic layer, as viewed in the circulating direction of regenerating gas in one circulating system, than a point B at which the second connecting gas passage 111b branches off from said second circulating path, and leads to the third circulating path 108c. This is because it is absolutely necessary to pass regenerating gas from a preceding chamber through a fluidized bed at least one time. Should these two points A and B in one circulating path not be in the above-described positional relationship, then regenerating gas from a preceding chamber would be short-circuited to the gas passage leading to the succeeding circulating system for the succeeding chamber. The reason why such a connecting gas passage is used as means for moving regenerating gas from one chamber to another is that, in case a gas passage be provided in a vertical partitioning wall in a portion above the surface of fluidized bed for the purpose of moving regenerating gas, there would be occasionally experienced the failure of regenerating gas to circulate in a desired fashion through a circulating system, resulting in the short-circuiting of gas stream.

In the drawings, there are shown the cases where the two partitioning walls 104a and 104b are provided, and hence two activated carbon passages 103a, 103b and three chambers 105a, 105b and 105c result. The chamber 105a is described as an upstream or first chamber, and the chamber 105c as a downstream on third chamber. This is, however, only for explanatory convenience, and the apparatus of the present invention is not limited to such three-stage apparatus. Where the number of the partitioning walls is more than 3, say n, then the number of the chambers is naturally n + 1.

The heat exchanger 109 disposed below the horizontal grid (or porous plate) 102 is provided for heating regenerating gas so as to make up for loss of heat arising when removing adsorbed matters from activated carbon as well as loss of heat during circulation in the circulating systems. The regenerating gas may be usually maintained at a temperature proper to removing adsorbed matters from activated carbon, for example at 50° to 200° C, which temperature depends upon the kind of organic compounds contained in activated carbon, thereby insuring removal of adsorbed matters from activated carbon.

In the embodiment shown in FIG. 1, the heat exchanger 109 is shown as being common to the respective chambers. Such a heat exchanger, however, may be provided independently for each chamber, if it is desirable, for adjustment of a regeneration temperature. The heat exchanger 109 may be placed, other than below the grid 102, in a fluidic layer of activated carbon so as to directly heat activated carbon, or otherwise may be placed in the circulating path 108. A configuration of the heat exchanger may be a pipe, with heat medium, such as vapor, passing therethrough, a pipe with fins for providing increased heat conductivity, or a sheath having heat medium therethrough which is adapted to be attached to respective circulating path 108.

The blower 110 may be attached, other than to each circulating path, to a lower portion of respective chamber 105 below the grid 102, or to an upper portion thereof in which there is no fear of activated carbon being blown up.

The regenerating gas supply port 115, although it is provided in the first chamber itself, may be provided in the wall of the circulating path 108a for the first chamber 105a. Likewise, the regenerating gas discharge port 116, although it is provided in the upper portion of the third chamber in the embodiment shown in FIG. 1, may be provided in the wall of the circulating path 108c, or in a lower portion of the third chamber at a level lower than that of the grid 102. In short, the regenerating gas discharge port may be provided in any portion, so far as discharge of regenerating gas containing the maximum of organic compounds is ensured, without the accompanying discharge of activated carbon.

The positional relationship between the junctions at which connecting gas passages join one circulating path is such that the junction A at which one connecting gas passage leading from the preceding circulating path joins one circulating path should be in the downstream phase (at a level lower than) of the junction B at which one end of the other gas passage leading to the succeeding path joins said one circulating path, so as to prevent regenerating gas streaming into said one circulating path from short-circuitting to the succeeding circulating path. The junction B at which one end of the other gas passage leading to the succeeding circulating path joins said one circulating path should be at a level higher than that of the fluidic layer of activated carbon, if such a gas passage is provided in respective chamber 105, so as to prevent admission of activated carbon into the gas passages.

Preferably, the junction B at which one connecting gas passage joins at its one end with the preceding circulating path should be in the upstream phase, rather than in the downstream phase, with respect to the junction A' at which said one gas passage joins at the other end with the succeeding circulating path. Thus, static pressure as well as dynamic pressure act on regenerating gas moving through the circulating system from one chamber to another, thereby minimizig pressure difference therebetween, whereby more smooth movement of activated carbon results, particularly when the junction point B takes the upstream phase.

Figure 2:
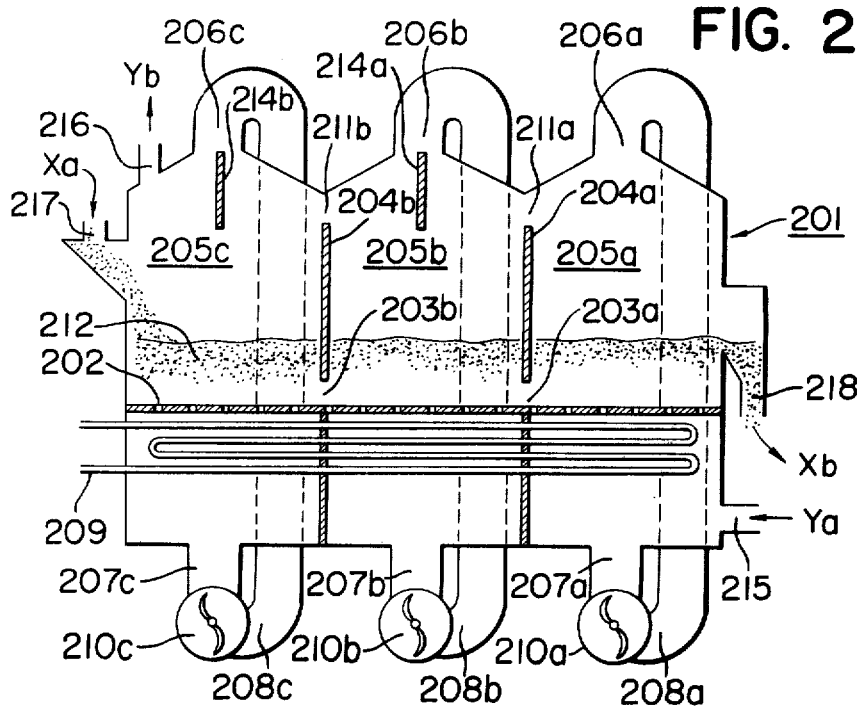
FIG. 2 is a vertical longitudinal view, partially in cross-section, diagrammatically showing another apparatus of the present invention.

FIG. 2 shows another embodiment of the present invention. The components shown at 201, 202, 203, 204, 205, 206, 207, 208, 209, 210, 212, 215, 216, 217 and 218 in FIG. 2 correspond to those shown at 101, 102, 103, 104, 105, 106, 107, 108, 109, 110, 112, 115, 116, 117 and 118 in FIG. 1, respectively, and are quite the same in function and features as described with reference to FIG. 1. The second embodiment is discriminated from the first embodiment in the points that gas passages 211 connecting the circulating systems are provided between the top ends of respective partitioning walls 204 and the top wall of the housing of the apparatus, and baffle plates 214 are provided for preventing short-circuit of regenerating gas. Respective gas passages 211 between the adjoining chambers are provided by disposing a partitioning wall between two chambers, with its top end spaced apart from the top wall of respective chambers. One baffle plate 214a is disposed between the two gas passges 211a and 211b adjoining the two chambers, while the other baffle plate 214b is disposed between the other gas passage 211b and the gas discharge port 216, so that regenerating gas coming from one chamber 205a or 205b through respective gas passages into the other chamber 205b or 205c may not be directly streamed into another chamber 205c or directly discharged through the discharge port 216 to the outside, without contacting activated carbon.

According to the apparatus of the present invention, regenerating gas streamed into one chamber is prevented from being short-circuitted to another chamber, such that regenerating gas permits to contact activated carbon to the fullest, with the assurance of removal of contaminants from activated carbon.

The invention may be embodied in other specific forms without departing from the spirit or essential characteristics thereof. The embodiments described above are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for the fluidizing regeneration of activated carbon having adsorbed organic contaminants therein comprising:
   a housing;
   a horizontal grid disposed within said housing;
   a port for supplying activated carbon to be treated and a regenerating gas discharged port, both of which are provided in the upper portion of one end wall of said housing;
   a regenerating gas supply port provided in a lower portion of the other end wall of said housing;
   a regenerated activated carbon discharge port provided in a lower portion of the other end wall and at a higher portion than said grid;
   a plurality of chambers defined by one or more vertical partitioning walls each having an opening through which activated carbon flows, said opening being above said grid and said plurality of chambers each having a top outlet port and a bottom inlet port;
   a circulating path joining said top outlet port and said bottom inlet port of each of said plurality of chambers, thereby constituting a regeneration gas circulating system for each respective chamber, said circulating system being equipped with a blower and a heat exchanger whereby a portion of said regenerating gas is recirculated within the chamber; and
   a gas passage for communicating each of the neighboring circulating systems whereby a portion of said regenerating gas is introduced directly from one chamber to the neighboring chamber.

2. The apparatus as defined in claim 1, wherein means are provided in the interior of the housing for the passage of gas to the respective neighboring circulating system of the apparatus.

3. The apparatus as defined in claim 1, wherein means are provided outside of said housing for the passage of gas to the respective neighboring circuiting system of the apparatus.

4. The apparatus as defined in claim 2, wherein said gas passage is provided in a portion near the top of the respective partitioning wall.

5. The apparatus as defined in claim 1, wherein activated carbon being treated is granular powder with a particle size of 0.1 to 3 mm in diameter.

6. An apparatus for the fluidizing regeneration of activated carbon having adsorbed organic contaminants therein comprising:
   a housing;
   a horizontal grid disposed in said housing;
   a port for supplying activated carbon to be treated and a regenerating gas discharge port, both of which are provided in upper portions of one end wall of said housing;
   a regenerating gas supply port provided in a lower portion of the other end wall of said housing;
   a regenerating activated carbon discharge port provided in a lower portion of the other end wall of said housing and at a higher portion of the said grid;
   a plurality of chambers defined by one or more vertical partitioning walls within said housing, said vertical partitioning walls each having an opening through which activated carbon flows, said opening being above said grid;

a top outlet port and a bottom inlet port both provided in each of said plurality of chambers;

regenerating gas circulating paths provided outside of the housing and respectively joining the top outlet port and the bottom outlet port of each respective chamber to constitute a circulating system whereby a portion of said regenerating gas is recirculated within the chamber;

a blower and a heat exchanger both provided in each circulating system consisting of one chamber and one circulating path, said blower causing said portion of said regenerating gas in each circulating system to circulate via the grid to the top outlet port, thereby recontacting said activated carbon in the chamber; and a gas passage extending between each of two neighboring circulating paths to connect said circulating systems with each other, the positional relationship between the junctions of the gas passage joining each two neighboring circulating paths being such that the junction of the gas passage leading from a preceding circulating path is at a level higher than that of a junction at the succeeding circulating path.

7. The apparatus as defined in claim 6, wherein activated carbon being treated is granular powder with a particle size of 0.1 to 3 mm in diameter.

8. An apparatus for the fluidizing regeneration of activated carbon having adsorbed therein organic contaminants comprising;

a housing;

a horizontal grid disposed in said housing;

a port for supplying activated carbon to be treated and a regenerating gas discharge port, both of which are provided in upper portions of one end wall of said housing;

a regenerating gas supply port provided in a lower portion of the other end wall of said housing;

a regenerated activated carbon discharge port provided in a lower portion of the other end wall of said housing and at a higher portion than said grid;

one or more vertical partitioning walls extending from the ceiling of the housing to the bottom thereof, thereby partitioning the interior of the housing into a plurality of chambers, said partitioning walls each having an opening through which activated carbon flows, each opening being above said grid and a regenerating gas passage in a portion near the top of the housing;

a top outlet port and a bottom inlet port both provided in each of said plurality of chambers;

a plurality of regenerating gas circulating path provided outside of the housing and respectively connecting the top outlet port and the bottom inlet port of respective chamber to constitute a circulating system; and a blower and a heat exchanger both provided in every circulating system consisting of one chamber and one circulating path.

9. The apparatus as defined in claim 8, wherein activated carbon to be treated is granular powder with a particle size of 0.1 to 3 mm in diameter.

10. The apparatus as defined in claim 1, wherein the interior of the housing is divided by two vertical partitioning walls into three chambers.

* * * * *